United States Patent
Jang

(10) Patent No.: US 9,061,677 B2
(45) Date of Patent: Jun. 23, 2015

(54) STEERING WHEEL APPARATUS FOR ADJUSTING STIFFNESS AND RECEIVING PRESSURE AND METHOD OF CONTROLLING THE SAME

(71) Applicant: Hyundai Motor Company, Seoul (KR)

(72) Inventor: Jin Hwan Jang, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/075,352

(22) Filed: Nov. 8, 2013

(65) Prior Publication Data

US 2015/0032334 A1    Jan. 29, 2015

(30) Foreign Application Priority Data

Jul. 25, 2013  (KR) .......... 10-2013-0087733

(51) Int. Cl.
| | | |
|---|---|---|
| *A01B 69/00* | (2006.01) | |
| *B60W 10/20* | (2006.01) | |
| *B60W 10/06* | (2006.01) | |

(52) U.S. Cl.
CPC ............... *B60W 10/20* (2013.01); *B60W 10/06* (2013.01)

(58) Field of Classification Search
CPC .... B60R 21/05; B60R 21/203; B60R 21/2032
USPC .......... 701/42, 48; 280/21.1, 5.512, 777, 732, 280/731
See application file for complete search history.

(56) References Cited

U.S. PATENT DOCUMENTS 8,757,658 B2 *  6/2014  Feinstein ................. 280/731
2011/0246028 A1  10/2011  Lisseman et al.

FOREIGN PATENT DOCUMENTS

| KR | 10-1997-0040853 | 7/1997 |
| KR | 10-1999-0013089 | 2/1999 |
| KR | 10-0254111 | 4/2000 |
| KR | 10-2005-0118393 A | 12/2005 |
| KR | 10-2006-0071285 A | 6/2006 |
| KR | 10-2006-0091690 | 8/2006 |
| KR | 10-2009-0063686 | 6/2009 |
| KR | 20-2010-0005060 U | 5/2010 |

* cited by examiner

*Primary Examiner* — Thomas G Black
*Assistant Examiner* — Luke Huynh
(74) *Attorney, Agent, or Firm* — Mintz Levin Cohn Ferris Glovsky and Popeo, P.C.; Peter F. Corless

(57) ABSTRACT

A steering wheel apparatus for adjusting stiffness and receiving a pressure is provided. The apparatus includes a rim having a ring-shaped frame structure and an air container disposed around an outer surface of the rim. An outer sheath covers an outer surface of the air container and an air nozzle is connected to an inside of the air container. A pressure sensor is mounted to the rim to detect a pressure by which the steering wheel apparatus is gripped and an air compressor and a vacuum pump are connected to the air nozzle. A steering controller analyzes signals input from sensors to maintain an air pressure of the air container and operate the air compressor or the vacuum pump when present condition information is satisfied. An engine controller analyzes a signal input from the pressure sensor and when the signal corresponds to a predetermined pressure or greater decelerate the vehicle.

3 Claims, 2 Drawing Sheets

STEERING WHEEL APPARATUS FOR ADJUSTING STIFFNESS AND RECEIVING PRESSURE AND METHOD OF CONTROLLING THE SAME

CROSS-REFERENCE TO RELATED APPLICATION

This application claims under 35 U.S.C. §119(a) the benefit of Korean Patent Application No. 10-2013-0087733, filed on Jul. 25, 2013, the entire contents of which are incorporated herein by reference.

BACKGROUND (a) Technical Field

The present invention relates to a steering wheel apparatus that adjusts stiffness and receives a pressure and a method of controlling the same. More particularly, the present invention relates to a steering wheel apparatus that adjusts stiffness and receives a pressure by which stiffness of a steering wheel is automatically adjusted based on a driving situation and a brake automatically engaged when the steering wheel is gripped at a predetermined pressure or greater in a danger situation during driving of the vehicle, and a method of controlling the same.

(b) Background Art

As generally known in the art, a steering wheel for steering a vehicle includes a rim that is gripped by a hand of a driver, and a spoke connected to an inner surface of the rim in which a horn and a remote control switch are installed. Since the rim of the steering wheel has a circular ring shape while a frame thereof being formed of a rigid body has a substantially high stiffness, that is, a hard stiffness, a grip feeling is decreased when the steering wheel is manipulated. In other words, a hand of the driver has slide. In particular, when a hand of the driver slides from a surface of the steering wheel while turning of the vehicle an accident may occur.

Further, a fatigue may be felt due to the hard stiffness of the steering wheel when the driver manipulates the steering wheel for a substantial amount of time and the chest of the driver may be damaged during a collision accident due to the hardness. A known related art discloses that an embossing tube deformed by a hydraulic pressure may be applied to a steering wheel and discloses that a PVC tube filled with compressed air may be applied to a steering wheel to decrease the risk of damage caused from the hardness.

Although the prior technologies apply a non-rigid material that has a lower stiffness to a steering wheel, the non-rigid material may only increase a grip feeling of the steering wheel and may not adjust stiffness of the steering wheel to correspond to a current situation of a driver and a driving situation. In other words, stiffness of the steering wheel may not be set to a value suitable for a preference of a driver, and stiffness of the steering wheel may not be changed based on a road situation during vehicle operation.

SUMMARY

The present invention provides a steering wheel apparatus and control method that adjusts stiffness and may variably control an air pressure in a steering wheel based on an intention of a driver or a driving situation to optimally adjust stiffness (e.g., surface resiliency) of the steering wheel, thereby providing a grip feeling of the steering wheel suitable for a driver and an improved manipulation feeling.

The present invention also provides a steering wheel apparatus and control method that receives a pressure and detects a pressure change by which a driver pressurizes a steering wheel in a sudden danger situation while driving the vehicle to adjust stiffness of the steering wheel and perform an emergency deceleration brake, thereby providing a driving convenience and a safety to a driver.

In accordance with an aspect of the present invention, a steering wheel apparatus for adjusting stiffness and receiving a pressure may include a rim that has a ring-shaped frame structure, an air container formed of an expandable and shrinkable material and disposed to surround an outer surface of the frame structure, and an outer sheath that covers an outer surface of the air container; an air nozzle connected to an inside of the air container, for blowing or suctioning air; a pressure sensor mounted to a predetermined location of the rim, for detecting a pressure by which a driver grips the steering wheel apparatus; an air compressor and a vacuum pump simultaneously connected to the air nozzle; a steering engine control unit (ECU) configured to analyze signals input from sensors to operate air pressure of the air container, and when preset condition information is satisfied, operate the air compressor or the vacuum pump; and an engine controller configured to analyze a signal input from the pressure sensor, and when the signal corresponds to a predetermined pressure or greater, execute deceleration of the vehicle.

The sensors may include a speed sensor configured to provide vehicle speed information, a tire pressure monitoring system configured to provide driving trembling information, a G-sensor (e.g., an accelerometer) configured to provide rough road driving information, a yaw rate sensor configured to provide rotation state information of the vehicle, and an airbag controller or a collision detection sensor configured to transfer an impact of the vehicle.

The steering wheel apparatus may further include a lamp controller configured to receive an emergency control signal from the steering controller to light an emergency lamp. In addition, positive and negative manipulation buttons for manually adjusting an air pressure in the air container based on an intention of a driver, and a setting button for setting an initial air pressure in the air container may be mounted to a spoke of the steering wheel. The outer sheath may be formed of a resilient material that is expandable and shrinkable based on a change in air pressure in the air container.

In accordance with another aspect of the present invention, a method of controlling a steering wheel apparatus for adjusting stiffness and receiving a pressure, may include: adjusting an air pressure of a steering wheel air container to increase or decrease the air pressure based on detection signals of sensors that provide various driving information of a vehicle to automatically increase or decrease a surface stiffness of the steering wheel; directly manipulating a manipulation button disposed in a spoke of the steering wheel to manually adjust a surface stiffness of the steering wheel to increase or decrease the surface stiffness; and decelerating a speed of a vehicle by using a pressure change by which the driver tightly grips the steering wheel.

The automatic adjustment of the surface stiffness of the steering wheel may include: receiving at least one of vehicle speed information, driving trembling information, rough road driving information, and collision information; determining an increase or decrease of an air pressure of the air container for driving situations in a steering wheel controller; and adjusting the air pressure of the air container to increase or decrease the air pressure and adjusting the surface stiffness of the steering wheel to increase or decrease the surface stiffness based on a signal due to a determination result of the steering wheel controller.

The manual adjusting of the surface stiffness of the steering wheel may include: adjusting the air pressure of the air container by pressing a positive manipulation button mounted to a spoke of the steering wheel to increase the air pressure and simultaneously adjusting the surface stiffness of the steering wheel to increase the surface stiffness; adjusting the air pressure of the air container by pressing a negative manipulation button mounted to the spoke of the steering wheel to decrease the air pressure and simultaneously adjusting the surface stiffness of the steering wheel to decrease the surface stiffness at the same time; and pressing a setting button mounted to the spoke of the steering wheel for a predetermined time or more, and setting an initial air pressure in the air container by input via positive and negative buttons.

The automatic deceleration control may include: detecting a pressure by which a driver tightly grips the steering wheel using a pressure sensor when the speed of the vehicle is a predetermined speed or greater; when a pressure detection value of the pressure sensor exceeds a normal range pressure, transferring a deceleration brake signal from the steering controller to the engine controller; and decelerating the vehicle by a deceleration control of the engine controller.

The automatic deceleration control may be performed simultaneously with outputting an emergency lamp lighting signal to a lamp controller from the steering controller to light an emergency lamp. The outputting of the emergency lamp lighting signal together with the automatic deceleration control may be performed even when a driver continues to release the steering wheel for a predetermined time or greater.

The present invention provides the following effects through the above-described technical solutions.

1) A steering wheel manipulating grip feeling of a driver may be improved and vibrations transferred to a steering wheel during high speed driving of a vehicle may be mitigated by adjusting stiffness of the steering wheel for an intention of a driver and a driving situation.

2) A manipulation of a steering wheel may be maximized by providing a desired grip feeling of the steering wheel to a driver during driving of the vehicle.

3) A steering wheel manipulating safety may be provided by automatically reducing stiffness of a steering wheel when the vehicle travels on a rough road surface and thus mitigating vibrations transferred from the road surface to the steering wheel.

4) A manipulation of a steering wheel may be improved by increasing contact between a hand of a driver and a steering wheel during a steering rotation manipulation for turning a vehicle.

5) Damage due to an impact to a steering wheel may be reduced by decreasing stiffness of a steering wheel and providing a surface of the steering wheel with resiliency during a collision or accident of the vehicle.

6) A driving feeling of a driver may be increased and a driving interest of the driver may be invoked by allowing the driver to adjust stiffness of the steering wheel to transfer vibrations of the vehicle or vibrations due to a road state to the steering wheel intentionally.

7) In particular, a speed of a vehicle may be decelerated without a separate brake manipulation to prevent an accident by applying a predetermined pressure or greater to the steering wheel, e.g., by tightly gripping the steering wheel by the driver during the risk of an accident due to a sudden change of a driving state.

8) A safety function may be expanded when a driver releases a steering wheel while driving fatigued e.g., an alarm may be transferred to a succeeding vehicle and a driver during an automatic braking operation.

BRIEF DESCRIPTION OF THE DRAWINGS

The above and other features of the present invention will now be described in detail with reference to exemplary embodiments thereof illustrated the accompanying drawings which are given hereinafter by way of illustration only, and thus are not limitative of the present invention, and wherein.

Figure 1:
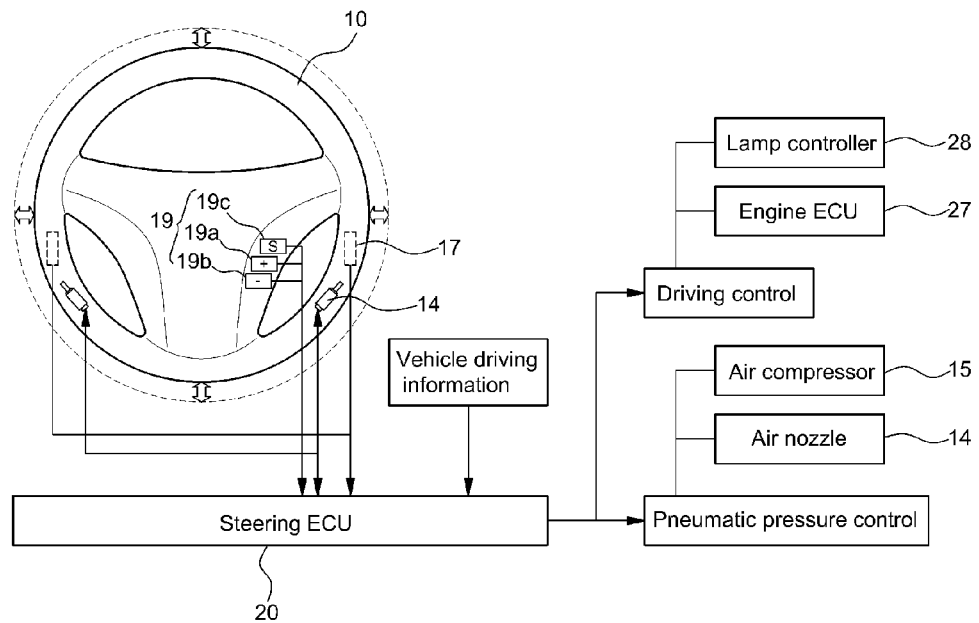
FIG. 1 is an exemplary diagram showing a steering wheel apparatus for adjusting stiffness and receiving a pressure according to an exemplary embodiment of the present invention.

It should be understood that the accompanying drawings are not necessarily to scale, presenting a somewhat simplified representation of various features illustrative of the basic principles of the invention. The specific design features of the present invention as disclosed herein, including, e.g., specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plugin hybrid electric vehicles, hydrogen-powered vehicles and other alternative fuel vehicles (e.g., fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

Figure 2:
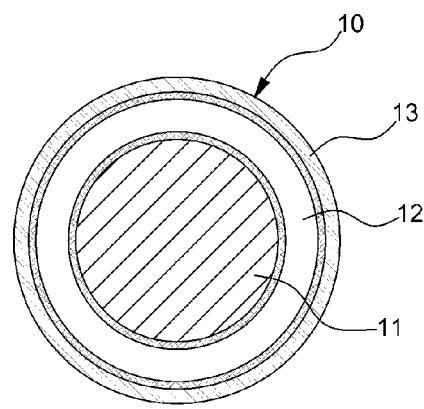
FIG. 2 is an exemplary sectional view showing a sectional structure of the steering wheel apparatus for adjusting stiffness and receiving a pressure according to an exemplary embodiment of the present invention.
Figure 3:
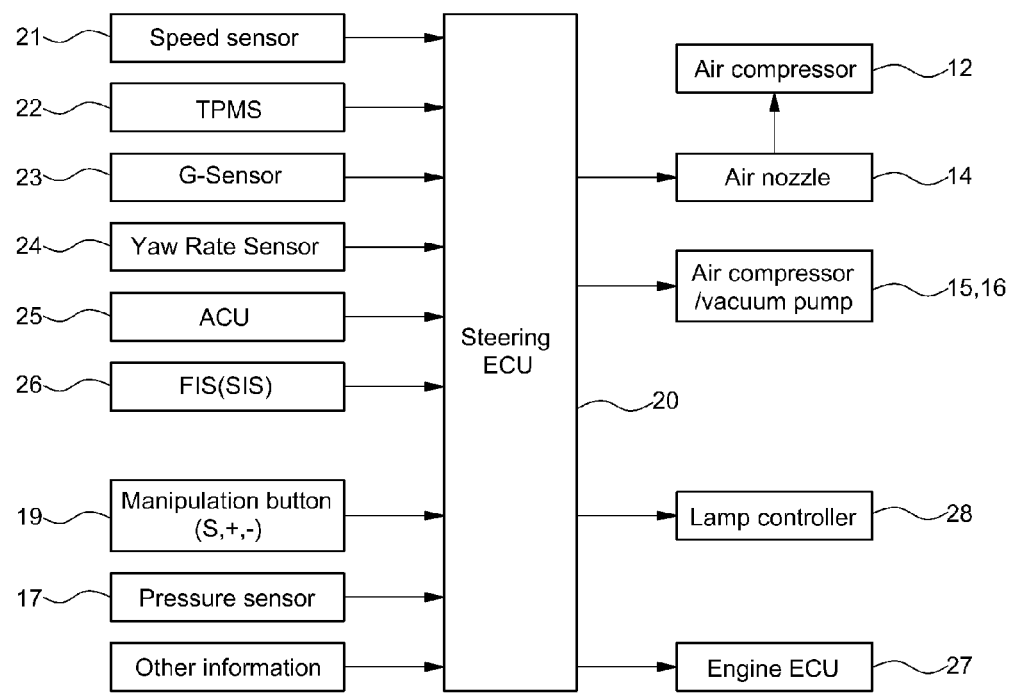
FIG. 3 is an exemplary control block diagram of the steering wheel apparatus for adjusting stiffness and receiving a pressure according to an exemplary embodiment of the present invention.

Referring to FIGS. 1 and 2, a rim 10 of a steering wheel may have a ring-shaped frame structure 11 (e.g., a hard steel ring structure), an air container 12 may be formed of an expandable and shrinkable material and disposed to surround an outer surface of the frame structure 11, and an outer sheath 13 may cover an outer surface of the air container 12 and define an outermost surface of the steering wheel. A resilient material that is expandable and shrinkable according to an increment of an air pressure in the air container 12 may be employed as the outer sheath 13.

In particular, an air nozzle 14 that blows air into the air container 12 to increase a surface stiffness of the steering wheel, or suctions and eliminates the air in the air container 12 to reduce the surface stiffness of the steering wheel may be connected to the air container 12 at a predetermined location. An air compressor 15 that supplies air into the air container 12, and a vacuum pump 16 that suctions and eliminates the air in the air container 12 may be simultaneously connected to the air nozzle 14.

Additionally, a plurality of pressure sensors 17 configured to detect a pressure by which a driver grips the rim 10 of the steering wheel may be mounted at predetermined locations on the rim 10 of the steering wheel, preferably, at lateral or rear locations. The air container 12 or the vacuum pump 16 may be operated in response to a control signal of a steering controller 20, and accordingly, a manual input signal and sensing information from the various sensors to operate the vehicle may be input to the steering controller 20.

Further, the sensors that input detection signals to the steering controller 20 to maintain an air pressure in the air container 12 may include a speed sensor 21 configured to detect vehicle speed information, a tire pressure monitoring system (TPMS) 22 configured to detect driving trembling information, a G-sensor 23 configured to detect rough road driving information, a yaw rate sensor 24 configured to detect rotation state information of the vehicle, and an airbag control unit (ACU) or a collision detection sensor (e.g., a front collision or side collision sensor) 26 configured to transfer an impact of the vehicle.

Positive and negative manipulation buttons 19a and 19b for manually adjusting an air pressure in the air container 12 according to an intention of a driver, and a setting button 19c for arbitrarily setting an initial air pressure in the air container 12 may be mounted to a spoke 18 of the steering wheel as a manual adjusting unit 19 that maintains an air pressure in the air container 12 based on an intention of the driver, and manipulation signals of the positive and negative manipulation buttons 19a and 19b and the setting button 19c may be input to the steering controller 20.

Meanwhile, the air compressor 15 and the vacuum pump 16 may be connected to an output side of the steering controller 20 to receive a control signal, and an engine controller 27 and a lamp controller 28 may be connected to receive a control signal to execute deceleration of the vehicle and operate a lamp in an emergency. Thus, when signals input from the sensors that maintain an air pressure of the air container 12 are analyzed by the steering controller 20 and preset condition information is satisfied, the air compressor 15 or the vacuum pump 16 may be operated to adjust the stiffness of the steering wheel to be increased or decreased by adjusting the air pressure in the air container 12.

A driver tightly grips the steering wheel when there is a risk of accident due to a rapid change of a driving state, in which case when a pressure sensor 17 detects an input to the steering controller 20 and the steering controller 20 analyzes an input signal to transfer a signal for determining a pressure of a predetermined value or greater to the engine controller 27, the engine controller 27 may be configured to decelerate an engine RPM to execute deceleration of the vehicle.

Hereinafter, a method of controlling the steering wheel according to an exemplary embodiment of the present invention will be described in detail.

Automatic Adjusting of Stiffness of Surface of Steering Wheel by Sensors

When information is input to the steering controller 20 in real time from the speed sensor 21 configured to detect vehicle speed information, the tire pressure monitoring system (TPMS) 22 configured to detect driving trembling information, the G-sensor 23 configured to detect rough road driving information, the yaw rate sensor configured to detect vehicle rotation state information, and the airbag control unit (ACU) 25 or the collision detection sensor (e.g., the front collision or side collision sensor) 26 configured to transfer an impact of the vehicle during driving of the vehicle, an air pressure in the air container 12 and a surface stiffness of the steering wheel may be adjusted for various driving situations.

In other words, an air pressure may be introduced into the air container 12 to increase a surface stiffness of the steering wheel or air may be discharged based on a suction operation of the vacuum pump 16 to decrease a surface stiffness of the steering wheel by analyzing input detection signals of the sensors in the steering controller 20, and transferring an output signal to the air compressor 15 or the vacuum pump 16 and opening the air nozzle 14 based on condition information which has been input in advance, simultaneously.

Manual Adjustment of Surface Stiffness of Steering Wheel According to Button Manipulation As described above, the positive and negative manipulation buttons 19a and 19b for manually adjusting an air pressure in the air container 12 based on an intention of a driver, and the setting button 19c for arbitrarily setting an initial air pressure in the air container 12 may be mounted to a spoke 18 of the steering wheel. When the positive manipulation button 19a is engaged (e.g., pressed), a positive input signal may be input to the steering controller 20, and air may be introduced into the air container 12 and a surface stiffness of the steering wheel may be increased by transferring an output signal to the air compressor 15 in the steering controller 20. Meanwhile, an input signal that corresponds to a predetermined maximum air pressure or greater may be neglected.

Meanwhile, when the negative manipulation button 19b is engaged (e.g., pressed), a negative input signal may be input to the steering controller 20, and air in the air container 12 may be discharged and a surface stiffness of the steering wheel may be decreased by transferring an output signal to the vacuum pump 16 in the steering controller 20 and opening the air nozzle 14. Further, a negative input that corresponds to a predetermined minimum air pressure or greater may be neglected.

Additionally, when the setting button 19c is engaged (e.g., pressed) for a predetermined period of time or more, the steering controller 20 may be configured to recognize that an initial pressure value in the air container is adjusted, in which case a pressure of the air container 12 may be adjusted through an operation of the air compressor 15 or the vacuum pump 16 by inputting positive and negative buttons of the manipulation button, and when a setting button input occurs again, the steering controller 20 may be configured to store the current air pressure in the air container as an initial pressure value.

Control of Deceleration of Vehicle According to Input of Pressure Sensor

A general vehicle braking process may be performed by decelerating the vehicle using a brake or decelerating the vehicle based on a speed of a preceding vehicle using an automatic driving system, and a pressure of the steering wheel (e.g., a pressure generated when a driver tightly grips the steering wheel) may remain unchanged during a normal braking process.

Meanwhile, when a preceding vehicle or an object suddenly appears, a driver may not be able to brake a vehicle with a sufficient time and an automatic driving system may not perform during the sudden appearance of an object or another vehicle. In addition, when a driver suddenly grips the steering wheel, a pressure change of the steering wheel may occur.

The present invention is also characterized in that an automatic deceleration control for decelerating a speed of a vehicle using a pressure change by which a steering wheel is tightly gripped in a sudden situation during driving of the vehicle.

First, when a vehicle speed input to the steering controller 20 by the speed sensor 21 is about 0 (e.g., when the vehicle is parked or stopped), and when a signal of the pressure sensor 17 that detects a sudden pressure change (e.g., a driver grips or releases the steering wheel) is input and an input signal of the setting button 19c is input to the steering controller 20 within a predetermined time, a pressure value in a normal range by which a driver grips the steering wheel may be determined. In other words, when the setting button 19c is pressed and a driver directly inputs a pressure change, a normal input range of the driver may be determined (e.g., a driver grips and releases the steering wheel) for a predetermined time (e.g., about 5 seconds). A pressure limited to a normal range may be stored in the steering controller 20.

Thereafter, when an input signal is transferred to the steering controller 20 while a value input from the speed sensor is a predetermined value or greater and the transferred pressure exceeds a pre-stored normal range pressure, the steering controller 20 may be configured to determine that the driver tightly grips the steering wheel during a sudden situation of the vehicle and may be configured to transfer a deceleration/emergent brake signal to the engine controller 27 and simultaneously transfer an emergency lamp lighting signal to the lamp controller 28. Thus, the vehicle may be decelerated through deceleration control of an engine RPM by the engine controller and the emergency lamp may be lit to alarm a danger situation to the periphery.

Hereinafter, exemplary embodiments of a method of controlling a steering wheel according to an exemplary embodiment of the present invention will be described in more detail.

High Speed Driving

When the speed sensor 21 determines that a speed input to the steering controller 20 is a predetermined speed or greater, the steering controller 20 may be configured to transfer an operation signal to the vacuum pump 16 and simultaneously open the air nozzle to discharge the air in the air container 12 through vacuum suction and a surface stiffness of the rim of the steering wheel may be adjusted to be decreased. Accordingly, as stiffness of the steering wheel is adjusted to be decelerated, vibrations transferred to the steering wheel may be absorbed during high speed driving and a grip feeling of the steering wheel may be increased during high speed driving, to increase a driving manipulation and a safety of the driver.

Rough Road Driving

When a tire pressure deviation input from a tire pressure alarm unit 22 to the steering controller 20 is a predetermined value or greater or a signal input from the G-sensor 23 to the steering controller 20 continues for a predetermined time or more, the steering controller 20 may be configured to transfer an operation signal to the vacuum pump 16 and simultaneously open the air nozzle 14 to discharge the air in the air container 12 through vacuum-suction or a surface stiffness of the rim of the steering wheel may be adjusted to be decelerated.

Further, after rough road driving is completed, an air pressure in the air container may be returned to an original value and a surface stiffness of the steering wheel may be returned to an original value. Accordingly, as stiffness of the steering wheel is adjusted to be decelerated, vibrations transferred to the steering wheel may be absorbed during rough road driving and a grip feeling of the steering wheel may be improved to increase an operation manipulation and a safety of the driver.

Turning (e.g., Rotation) of a Vehicle

When a speed input from the speed sensor 21 to the steering controller 20 is a predetermined value or greater and a detection value of the yaw rate sensor 24 is detected to be a predetermined value or greater during turning of the vehicle, the steering controller 20 may be configured to transfer an operation signal to the vacuum pump 16 and open the air nozzle 14, to discharge the air in the air container 12 through vacuum-suction and a surface stiffness of the rim of the steering wheel may be adjusted to be decelerated. After turning of the vehicle, the air pressure in the air container may be returned to an original value and a surface stiffness of the steering wheel may be returned to an original value. Therefore, during turning of the vehicle, the air in the air container may be discharged to adjust stiffness of the steering wheel to a predetermined level, to prevent a danger of an accident when the steering wheel is released by increasing a grip feeling of the steering wheel.

Vehicle Collision

When a collision detection signal of the airbag control unit 25 or the collision detection sensor 26 is input to the steering controller 20, the steering controller 20 may be configured to transfer an operation signal to the vacuum pump 16 or open the air nozzle 14, to discharge the air in the air container 12 through vacuum-suction and a surface stiffness of the rim of the steering wheel may be adjusted to a level of absorbing an impact. Accordingly, when the chest of the driver contacts the steering wheel during a collision, an impact applied to the driver may be absorbed and injury to the driver may be mitigated.

User Option (e.g., Sports Mode)

In a situation in which a driving mode of the vehicle is set to a sport mode, when a speed input to the speed sensor is a predetermined speed or greater or a detection value of the yaw rate sensor is a predetermined value or greater, the steering controller 20 may be configured to transfer an operation signal to the air compressor 15 and simultaneously open the air nozzle 14, to supply air into the air container 12 and a surface stiffness of the steering wheel may be adjusted to be increased. Accordingly, vibrations may be intentionally transferred to the steering wheel during driving of the vehicle to cause a minute steering manipulation of the driver to increase a driving feeling of the driver.

Sudden Situation during Vehicle Driving

When a sudden pull of the steering wheel or a tight grip of the steering wheel in a normal range or more is detected by the pressure sensor 17 due to a sudden danger situation or a rapid change of a road situation during driving of the vehicle, the pressure sensor 17 may be configured to transmit the detection result to the steering controller 20. The steering controller 20 may be configured to determine that a pressure detection value of the pressure sensor 17 exceeds a normal range, and may be configured to output a brake signal to the engine controller 17 and simultaneously output an emergency lamp lighting signal to the lamp controller 28. Thus, the engine controller 27 may be configured to decelerate the vehicle to a speed (e.g., 60 km or less) at which a stable manipulation is possible and may be configured to light an emergency lamp until a predetermined speed during deceleration of the vehicle to alarm a danger situation to a succeeding vehicle.

Dozing Off While Driving

When a driver releases the steering wheel for a predetermined time or more (e.g., 10 seconds or more) due to dozing off while driving, the steering controller 20 may be configured to output a brake signal to the engine controller 27 and simultaneously output an emergency lamp lighting signal to the lamp controller 28. Thus, the engine controller 27 may be configured to decelerate the vehicle to a speed (e.g., 60 km or less) at which the vehicle may be stably manipulated, and the lamp controller 28 may be configured to light the emergency lamp until a predetermined speed during the deceleration to alarm a danger situation to a succeeding vehicle.

Then, when the steering controller 20 may be configured to receive a no pressure signal of the pressure sensor continuously (e.g., additional 10 seconds), a brake signal may be transferred to the engine controller 27 until a signal of a speed of about 0 is received from the speed sensor to decelerate the vehicle until the vehicle is stopped.

Change of Steering Grip Intensity of Driver

Since gripping forces of drivers may be different, the air pressure in the air container 12 may be adjusted to a desired level by inputting a pressure value at which the driver grips the steering wheel. When the pressure sensor detects a pressure value at which a driver grips the steering wheel when the vehicle is parked or stopped, the steering controller may be configured to compare the pressure value with pressure values for predetermined grades. When a pressure whose grade is greater than a grade of the current pressure value is received based on the comparison result, an internal pressure of the air container 12 may be adjusted to be increased. Additionally, when a pressure whose grade is less than a grade of the current pressure value is received, an internal pressure of the air container 12 may be adjusted to be decelerated.

What is claimed is:

1. A steering wheel apparatus for adjusting stiffness and receiving a pressure, the steering wheel apparatus comprising:
   a rim having a ring-shaped frame structure;
   an air container formed of an expandable and shrinkable material and disposed to surround an outer surface of the frame structure of the rim;
   an outer sheath that covers an outer surface of the air container;
   an air nozzle connected to an inside of the air container to blow or suction air;
   a pressure sensor mounted to a predetermined location of the rim and configured to detect a pressure by which the steering wheel apparatus is gripped;
   an air compressor and a vacuum pump connected to the air nozzle;
   a steering controller configured to analyze signals input from sensors to adjust air pressure of the air container, and when preset condition information is satisfied, operate the air compressor or the vacuum pump; and
   an engine controller configured to analyze a signal input from the pressure sensor, and when the signal corresponds to a predetermined pressure or greater, execute deceleration of the vehicle,
   wherein the steering controller is configured to output a brake signal to the engine controller so that the engine controller decelerates the speed of the vehicle when the pressure sensor receives a pressure detection value exceeding a normal range pressure, no pressure signal of the pressure sensor continuously for a predetermined time period.

2. A method of controlling a steering wheel apparatus for adjusting stiffness and receiving a pressure, the method comprising:
   adjusting, by a steering controller, air pressure of an air container of a steering wheel to increase or decrease the air pressure based on detection signals of sensors that provide various driving information of a vehicle to automatically increase or decrease a surface stiffness of the steering wheel;
   detecting, by the steering controller, a manipulation of an manipulation button disposed in a spoke of the steering wheel to manually adjust a surface stiffness of the steering wheel to increase or decrease the surface stiffness; and
   transmitting, by the steering controller, deceleration control signal to decelerate a speed of a vehicle based on a pressure change by which the steering wheel is gripped,
   wherein the automatic deceleration control includes:
   detecting, by a pressure sensor, a pressure by which the steering wheel is gripped when the speed of the vehicle is predetermined speed or greater; and
   when a pressure detection value of the pressure sensor exceeds a normal range pressure, transferring, by the steering controller, a deceleration brake signal to an engine controller to decelerate the speed of the vehicle.

3. The method of claim 2, wherein the automatic adjusting of the surface stiffness of the steering wheel includes:
   receiving, by the steering controller, at least one of vehicle speed information, driving trembling information, rough road driving information, and collision information;
   determining, by the steering controller, an increase or decrease of air pressure of the air container for driving situations;

adjusting, by the steering controller, the air pressure of the air container to increase or decrease the air pressure; and adjusting, by the steering controller, the surface stiffness of the steering wheel to increase or decrease the surface stiffness based on a control signal.

* * * * *